(12) United States Patent  
Stapleford et al.

(10) Patent No.: US 9,137,356 B1  
(45) Date of Patent: Sep. 15, 2015

(54) REMOTELY ACTIVATED ON-HOLD CIRCUIT

(71) Applicants: Scott Holmes Stapleford, Londonderry, NH (US); Gary Nelson Stapleford, Londonderry, NH (US)

(72) Inventors: Scott Holmes Stapleford, Londonderry, NH (US); Gary Nelson Stapleford, Londonderry, NH (US)

( * ) Notice: Subject to any disclaimer, the term of this patent is extended or adjusted under 35 U.S.C. 154(b) by 0 days.

(21) Appl. No.: 13/872,125

(22) Filed: Apr. 28, 2013

Related U.S. Application Data

(63) Continuation of application No. 12/576,256, filed on Oct. 9, 2009, now abandoned.

(51) Int. Cl.  
    *H04M 11/00* (2006.01)  
    *H04M 1/80* (2006.01)

(52) U.S. Cl.  
    CPC ..................................... *H04M 1/80* (2013.01)

(58) Field of Classification Search  
    USPC .............................. 379/93.35, 215.01, 201.01  
    See application file for complete search history.

(56) References Cited

U.S. PATENT DOCUMENTS 6,118,861 A * 9/2000 Gutzmann et al. ........ 379/201.01

* cited by examiner

*Primary Examiner* — Simon King  
(74) *Attorney, Agent, or Firm* — Joseph E. Funk

(57) ABSTRACT

A system for adding wireless on-hold capability to standard single or multi-line telephones connected to one or more phone lines. The system includes a wireless on-hold unit with transceiver associated with each telephone and each on-hold unit includes a button for each telephone line for indicating when a telephone line is to be placed into or removed from an on-hold state and a visual indicator indicating which state each telephone line is in. The system also includes a central control unit with transceiver hard wired connected between the phone lines and the telephone(s) connected to each phone line, and the central control unit places a phone line in an on-hold state or removes the on-hold state based on signals wirelessly received from the on-hold units.

6 Claims, 7 Drawing Sheets

REMOTELY ACTIVATED ON-HOLD CIRCUIT

REFERENCE TO RELATED APPLICATIONS

This application is a continuation of U.S. application Ser. No. 12/576,256 filed Oct. 9, 2009; the content of each of which is incorporated herein by reference in their entireties.

FIELD OF THE INVENTION

Embodiments of this invention generally relate to adding the capability of "on-hold" via a wireless link to standard single or multi-line phones that do not utilize a "KSU" (Key Service Unit) to activate the "on-hold" feature set. Additionally this wireless link method will allow for injection of music and messages into the phone system for a true full functioning "on-hold" circuit.

BACKGROUND OF THE INVENTION

There have been three main methods for adding an "on-hold" circuit to present day telephones; the first method utilizes a KSU or Key Service Unit in which the phones are specially designed to work with this main processing unit. The "on-hold" button is designed into the phones and is activated by pressing this button which in turn sends this activation data to the main KSU which performs the hold function. The KSU and phones are generally for larger business and because of the cost, maintenance and complex nature of programming are not used by the small business owner.

The second method for adding an "on-hold" circuit utilizes a locally "store-bought" single or multi-line phone with a hold button. A few problems arise when using this method since out of the complete population of single and multi-line phones that are available only a few will have a hold button. The few phones that do incorporate a hold button generally will put the customer on-hold, but will not give the ability to inject music and/or messages into the hold circuit while the customer is on-hold.

The third and final main method that is used for adding an "on-hold" circuit utilizes special after market devices that attach to either the incoming phone line or phone handset cord. Along with having to hardwire these devices most are not compatible with all standard phones without some type of tuning or special versions of the models that are available. When adding additional phones after the initial installation some systems require retuning because of the additional impedance created on the phone line. The methods used to place callers on-hold using these systems is not consistent; with some using special cumbersome buttons or large switch boxes hardwired to the phone line or phone cord. While others utilize the touch-tone keys on the phone to activate the hold circuit which is sometime an annoyance to the customer since they hear this tone before being put on-hold.

Conventional means and methods known today for adding and implementing an "on-hold" circuit are burdensome, expensive, time-consuming, and/or do not provide a reliable method, and thus are often not deployed into service. What is needed in the art is a reliable, expedient and cost effective method to adding an "on-hold" circuit to a "store-bought" single or multi-line phones.

SUMMARY

The novel On-Hold system basically comprises two parts, (1) a central control unit and (2) one or more wireless on-hold units. The central control unit is simply connected in series between a telephone line and one or more telephone sets that are normally connected to the telephone line. The telephone sets are standard single and multiline telephone sets that have no On Hold functionality incorporated therein and the invention provides such On Hold functionality with no modifications to the telephone sets or to their wiring. The central control unit wirelessly communicates with an On Hold unit that is located with each telephone set to which on hold functionality is to be added. When a person utilizing a telephone set wishes to place a call on hold they depress a button on the wireless On Hold unit associated with the telephone set being utilized. This causes a signal to be wirelessly transmitted to the central control unit which responds thereto to place the call on hold and, if desired, to inject music or a recorded message onto the telephone line toward all telephone sets connected to the line.

The invention provides wireless on hold capability for standard single and multi-line telephones phones using a hardwired central control unit (transceiver) that is hardwired to the incoming phone lines and to the phones, and a wireless On-Hold unit associated with each phone. Moreover, the invention is capable of transmitting acknowledgment information back to the user at a phone relating to: (1) when a caller has been placed "on-hold" or (2) when the caller has been taken "off-hold".

As an incoming call is being received the central office is generating a ring signal while the phone is on-hook. Once this call is answered the phone will be off-hook and loop current on the line will be generated. This off-hook operation along with the line-current is detected by the central control unit of the invention. The central control unit now allows the wireless On-Hold units to be available for activation.

In some embodiments, when a call has been answered and the action of placing the caller on-hold is required a user would press a corresponding line number button on the wireless On-Hold unit. This action will cause the On-Hold unit to send an encrypted wireless signal to the central control unit that is hardwired to the telephone lines and the extension phones. The central control unit's internal logic switches the particular telephone line to an on-hold state and injects an external or internal music or message source into the telephone line toward the phones. This action would also send an audio feedback beep or tone to the user of the On-Hold system to alert them that the line is in the on-hold state.

When a call has been placed in the on-hold state the central control unit transmits an encrypted acknowledgement signal to the wireless on-hold unit. This signal received by the wireless on-hold unit causes a built-in LED to flash and alert the user that a caller is in the on-hold mode.

In some embodiments, when a call is to be taken off-hold the user would again press the corresponding line number button on the novel wireless on-hold unit. This action sends another encrypted wireless signal to the central control unit that is hardwired to the telephone line(s) and telephone(s). Responsive thereto the central control unit's internal logic will switch the telephone line to an off-hold state and removes the injected external or internal music or message source. This action would also remove any audio feedback beep or tone to the user of the system.

When a call has been taken off-hold the central control unit transmits an encrypted signal to the wireless on-hold unit. This signal received by the wireless on-hold unit turns off the built-in LED and signals the user that a caller is in the off-hold mode.

In some embodiments, when either the caller has hung up or line-current and the user has hung up (on-hook) and the system is not in the on-hold mode the wireless on-hold buttons are deactivated until the next call cycle to conserve battery.

DETAILED DESCRIPTION

Figure 1:
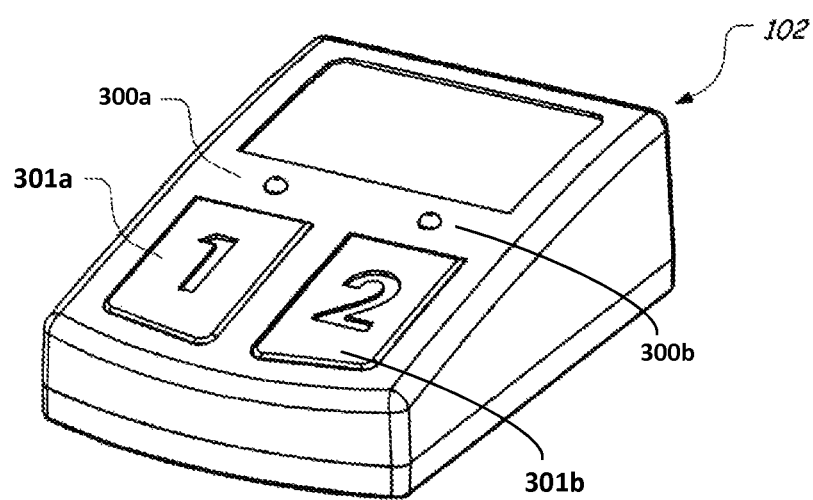
FIG. 1 is a front perspective view of the wireless on-hold unit of the novel On-Hold system.
Figure 3:
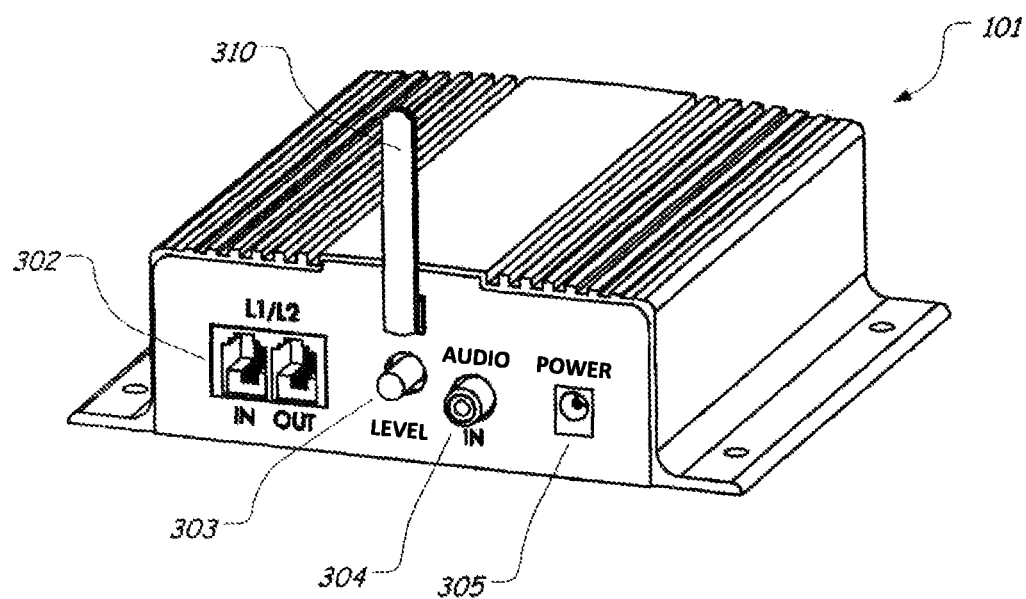
FIG. 3 is a rear perspective view of the central control unit.
Figure 4:
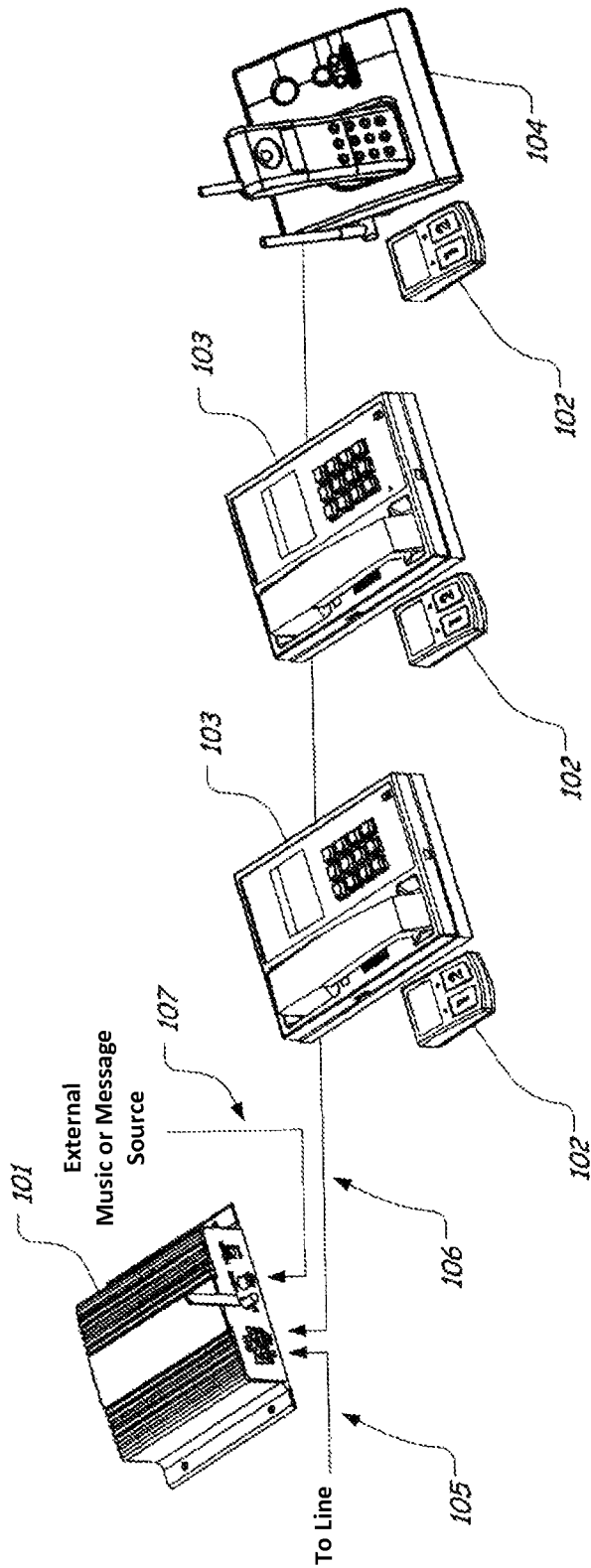
FIG. 4 is a connection diagram of the On-Hold system shown in FIG. 1 and FIG. 2.

The invention basically comprises two parts, (1) a central control unit 101 (FIG. 2-front view, and FIG. 3—rear view), and (2) one or more wireless on-hold units 102 (FIGS. 1, 4). Control unit 101 is simply inserted in series between a telephone line 105 (FIG. 4) and a one or more telephone sets 103, 104 (FIG. 4) that are normally connected to the telephone line 105 via wiring 106. The telephone sets 103, 104 are standard telephone sets that have no On Hold functionality incorporated therein and the invention provides such On Hold functionality with no modifications to the telephone sets 103, 104 or their wiring.

The central control unit 101 wirelessly communicates with an On Hold unit 102 that is positioned with each telephone set 103, 104 to which on hold functionality is to be added (FIG. 4). When a person utilizing one of telephone sets 103, 104 wishes to place a current call "on hold" they depress a button 301a (one line) or 301b (two line) on the wireless On Hold unit 102 adjacent to the telephone set 103, 104 being utilized. This causes a coded signal to be wirelessly transmitted from unit 102 to the central control unit 101 which responds thereto to place the call "on hold" and, if desired, to inject music or a recorded message onto the telephone line toward all telephone sets connected to the line. To release the "on hold" status the button 301a or 301b is depressed a second time.

While the invention will most likely be utilized with single line telephones it may also be utilized with two line telephones. In such a case the central control unit 101 has jacks for two telephone lines and there is a second On Hold button 301b on wireless On Hold unit 102.

More particularly, the invention comprises one or more wireless on-hold button units 102, as shown in FIGS. 1 and 4, that are used for activation and deactivation of central control unit 101 to provide an "on hold" function for telephone sets 103, 104 in FIG. 4. Activation of central control unit 101 is accomplished by pressing the corresponding line number button 301a or 301b on a wireless unit 102. In response, unit 101 places a hold on the corresponding telephone line and, when provided, connects music or another audio signal at its input 304 to the telephone line to be heard at telephone sets 103, 104.

Acknowledgement of the on-hold status is verified to the user by a signal that is sent from central control unit 101 to wireless unit 102 that causes LED indicator 300a or 300b thereon to flash at a constant rate of one second on and one second off. Deactivation of the "on-hold" status is accomplished by pressing the corresponding line number button 301 on unit 102 a second time. Responsive thereto central control unit 101 removes the "on hold" status on telephone line 105 and sends a signal to units 102 turning their LED indicators 300 a or b off. Acknowledgement of the "off-hold" status is verified to the user by the LED indicator 300 a or b turning off.

Figure 2:
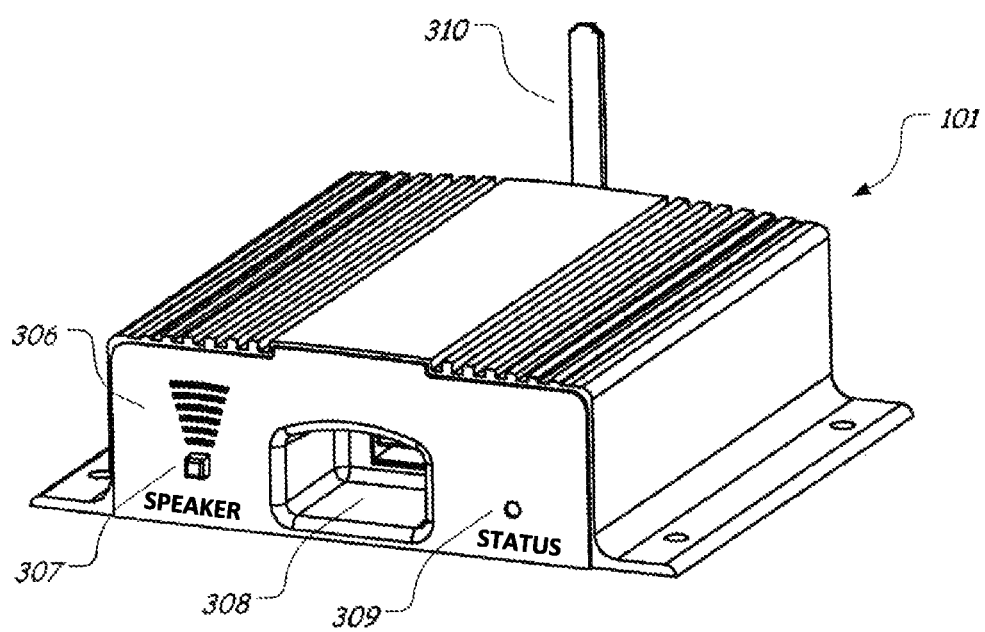
FIG. 2 is a front perspective view of the central control unit.
Figure 7:
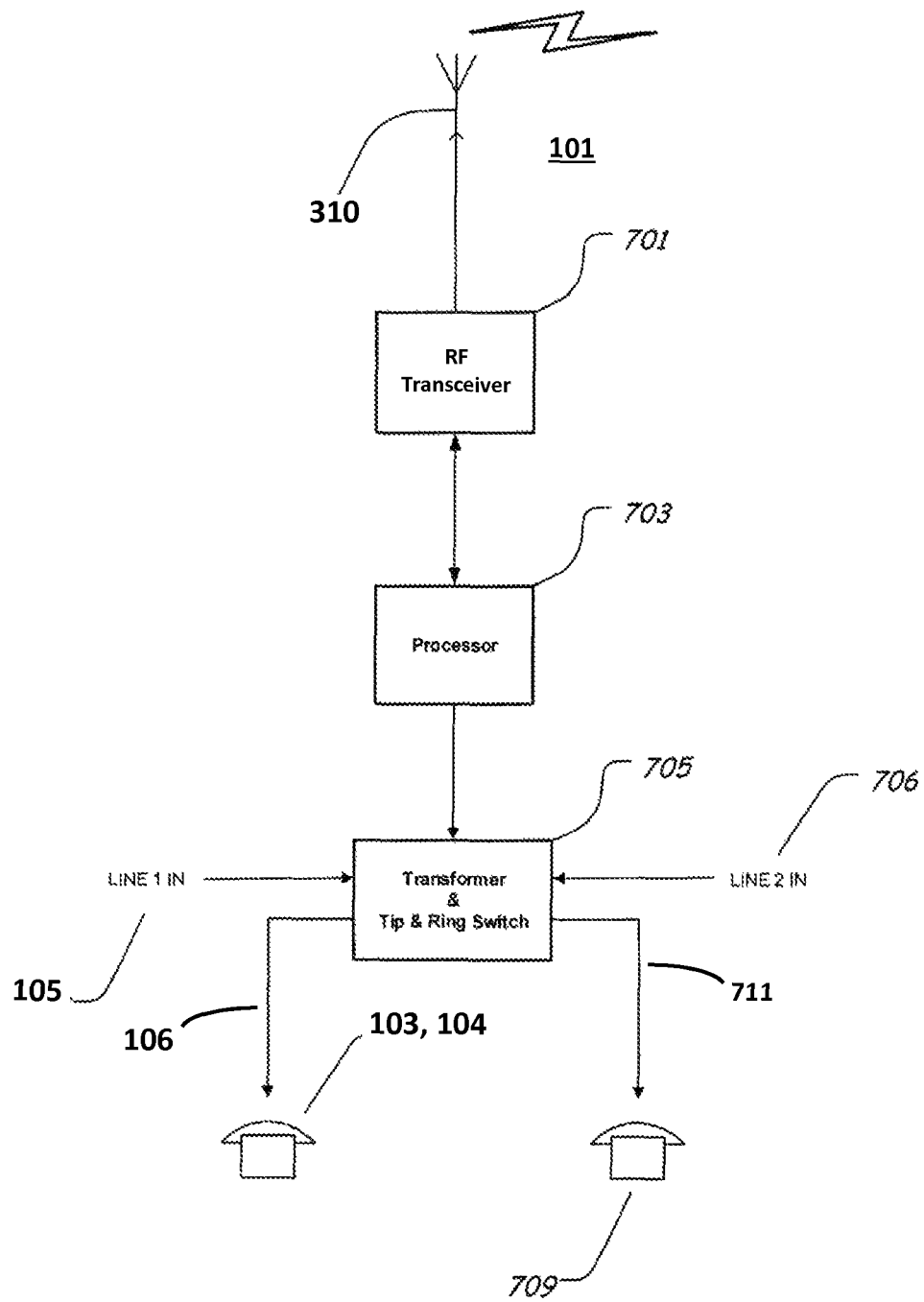
FIG. 7 is a schematic block diagram of the central control unit of the On-Hold system.

Central control unit 101 is shown in FIGS. 2 and 3. FIG. 2 is a front view of unit 101 and FIG. 3 is a rear view thereof. FIG. 7 is a schematic block diagram of unit 101. As shown in FIG. 2 central control unit 101 consists of a small internal speaker 306 that is used to monitor the music or message being fed into unit 101 via Audio In jack 304 on the back of unit 101, or via USB input 308 on the front of unit 101. The internal speaker 306 can be turned on or off by pressing speaker switch 307. A status indicator LED 309 on the front of central control unit 101 is used to give a visual feedback to the user of the operational status of central control unit 101.

The rear view of central control unit 101 is shown in FIG. 3 and is where all hardware connections are made. The version of unit 101 shown in FIG. 3 is for a single phone line and there is a single set of line in and line out telephone jacks 302. The incoming phone line 105 (FIG. 4) is connected to the IN jack of telephone jack 302 and line 106 (FIG. 4) to telephone sets 103, 104 is connected to the OUT jack of 302. For a dual line phone system a second set of jacks 302 are provided. If an external music source is utilized then the audio is fed into the AUDIO IN RCA jack 304 on the rear of central control unit 101, which has a corresponding Level control 303 to adjust the volume. Power to central control unit 101 is supplied via a power cord (not shown) to POWER jack 305. An antenna 310 is used for all RF control communications between central control unit 101 and the wireless on-hold unit 102 associated with, but not otherwise connected to, telephone sets 103, 104. As previously mentioned telephone sets 103, 104 are of the types typically found in the market place that have no built in On Hold function, and they are the majority of telephones in use.

FIG. 4 is a connection block diagram of the novel On-Hold system that illustrates a typical way to interconnect the novel On Hold system to an incoming phone line 105 and to standard 103 and cordless 104 telephones. For example, in the embodiment shown in FIG. 4, an incoming phone line 105 would attach to the line IN input jack on the rear of central control unit 101 (FIG. 3). From the line OUT jack on the rear of central control unit 101 (FIG. 3) standard telephones 103 and cordless telephones 104 connect in a conventional parallel wired circuit 106. To provide On-Hold functionality to these telephones a wireless On-Hold unit 102 is placed next to each standard telephone 103 and cordless telephone 104 requiring a remote on-hold circuit per the teaching of the invention, as shown in FIG. 4. The central control unit 101 has an audio input 304 (FIG. 3) for an external music or message source to be used for the On-Hold function. Alternatively, such music or message may be on a USB memory stick (not shown) that is inserted into USB port 308 in FIG. 2.

Figure 5:
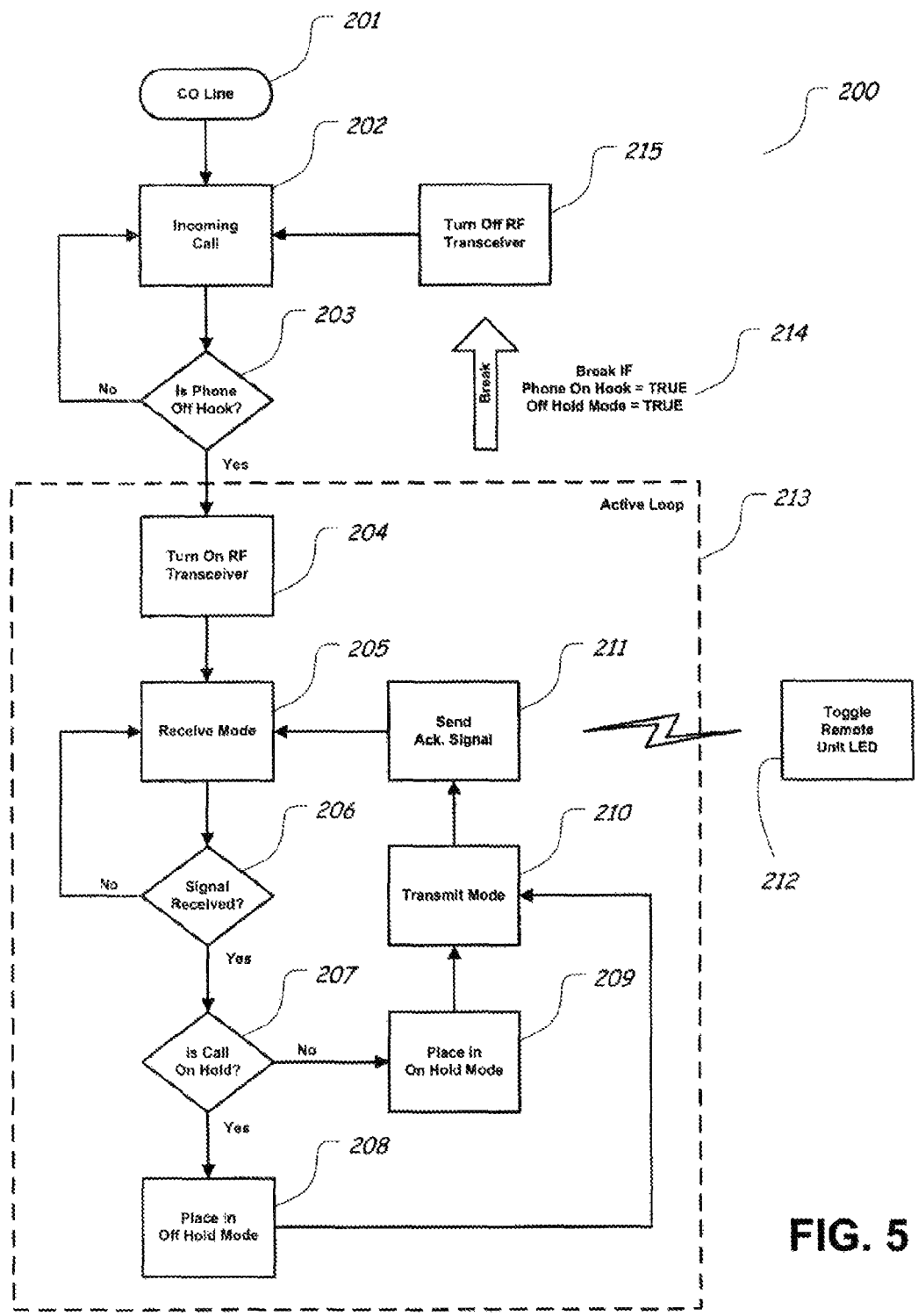
FIG. 5 is the logic flowchart of operation of the On-Hold system.

FIG. 5 illustrates one example of a process flow 200 as one of the possible ways to carry out the On-Hold processes performed using central control unit 101 and wireless on-hold units 102. The On-Hold program logic performed in central control unit 101 begins at central office line block 201 and proceeds to incoming call decision block 202 where telephone line 105 (FIG. 4) is continuously monitored to determine if an incoming call is currently being received. If there is no incoming call, the program logic remains at block 202. If there is an incoming call central control unit 101 logic proceeds to decision block 203 where it is determined if a phone is off-hook. If there is no phone 103 or 104 off hook the control unit 101 returns to decision block 202. When there is a phone off-hook (FIG. 4), then the central control unit 101 logic enters into the active loop stage, represented by dotted line block 213 in FIG. 5, where the logic proceeds to block 204 which turns on an RF transceiver 701 in central control logic unit 101 (FIG. 7), before proceeding to block 205 which changes the state of the last mentioned RF transceiver 701 to its receive mode awaiting receipt of an On-Hold signal from one of On-Hold units 102. The central control unit 101 logic then proceeds to decision block 206 to determine if an RF signal transmitted from central control unit 101 has been received by the wireless On-Hold units 102 (FIG. 1) indicating that the line is in its on-hold state and, if so, causing its LED 301a (FIGS. 1 & 6) or LED 301b (FIGS. 1 & 6) to be lit. If no RF signal has been received by an On-Hold unit 102 the control unit 101 logic returns to block 205. If an RF signal has been received from the wireless On-Hold unit 102, then the central control unit 101 logic continues to decision block 207. The control unit 101 determines at decision block 207 if the subject incoming telephone line is in an on-hold state. If not, the control unit 101 logic proceeds to block 209 and places the incoming phone line in the on-hold state, then places control unit 101 into a transmit mode at block 210. The control unit 101 logic then progresses to block 211 and causes an acknowledgement signal to be sent to wireless on-hold unit 102 which toggles an LED 301a or 301b (FIG. 6) and then returns into the logic path at block 205. If the central control unit 101 logic is already in the on-hold state then the logic proceeds to block 208 where it is put in the off-hold state. The process then cycles back to block 210 to place central control unit 101 into a transmit mode at block 210. This is followed by the transmission of an acknowledgement signal to wireless on-hold unit 102 at block 211 which toggles an LED 301a or 301b (FIG. 6) at block 212 before returning into the logic path at block 205. The active loop block 213 (FIG. 5) can at any point be broken out of at decision block 214 if central control unit 101 senses that the phone is on-hook AND is in the off-hold mode. If the decision made at decision block 214 is TRUE, then the logic proceeds to block 215 in which the RF transceiver in central control unit 101 is turned off before proceeding to decision block 202 to await another call.

Figure 6:
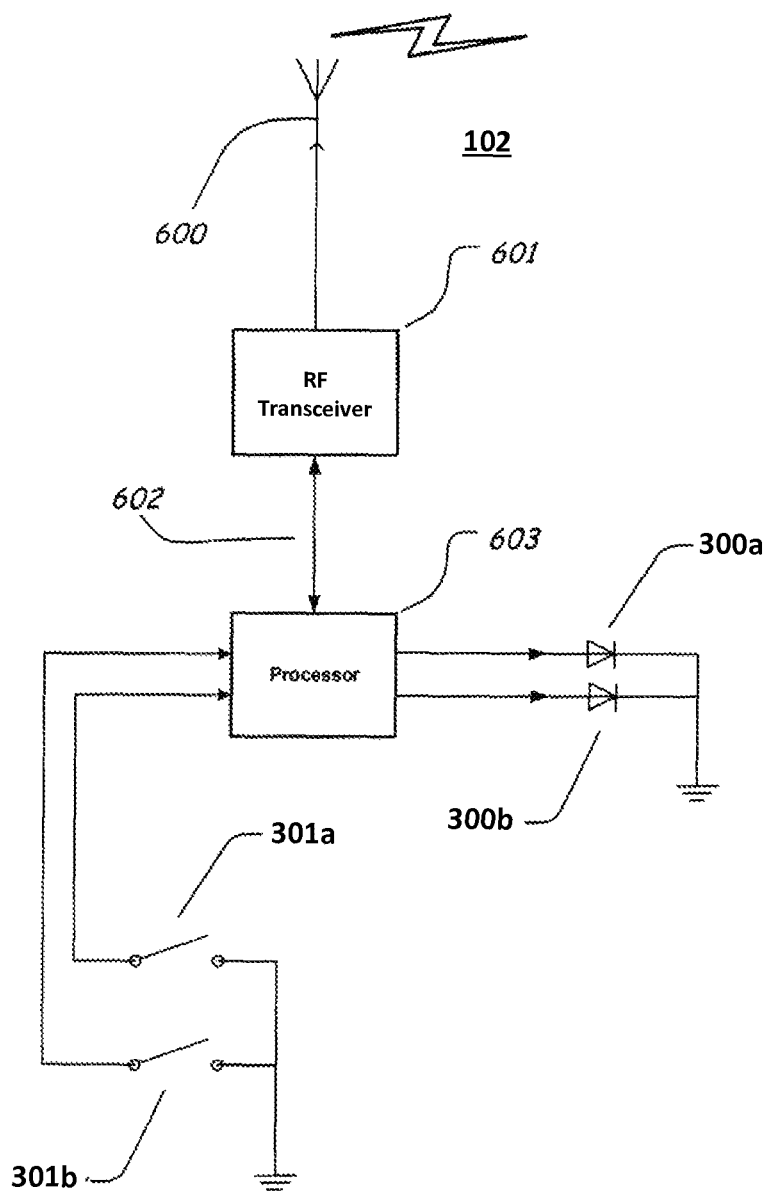
FIG. 6 is a schematic block diagram of the wireless on-hold unit of the On-Hold system.

In FIG. 6 is a schematic block diagram of an On-Hold unit 102. There is an RF transceiver 601 having an internal antenna 600 connected thereto that does not show in FIG. 1. Transceiver 601 is controlled by a processor 603 which also has a line 1 on-hold LED 300a and a line 2 on-hold LED 300b (see also FIG. 1) connected thereto. Processor 603 also has momentary buttons 606 and 607 connected thereto (buttons 301 in FIG. 1) that are used by a user of the phone to indicate when a call on either line 1 or line 2 is to be placed on-hold. While FIGS. 6 and 1 show an On-Hold unit 102 for handling two phone lines, when there is only one phone line button 301a and one LED 300a in FIG. 1, and button 301b and LED 300b in FIG. 6 are utilized. Alternatively, an On-Hold unit 102 may be provided that has only a single button and a single LED.

To place an ongoing telephone call on line 1 on-hold a person using a phone 103 or 104 (FIG. 4) momentarily presses on-hold button 606 on the associated On-Hold unit 102 (FIG. 4) to place the call on-hold, and momentarily presses on-hold button 607 to place a call on line 2 on-hold. Responsive to a person pressing button 606 processor 603 causes RF transceiver 601 to transmit a coded signal to central control unit 101 (FIGS. 2&3)(FIG. 7) indicating line 1 is to be placed on hold, and responsive to a person pressing button 607 processor 603 causes RF transceiver 601 to transmit a different coded signal to central control unit 101 (FIGS. 2&3) (FIG. 7) indicating line 2 is to be placed on hold.

As described in more detail with reference to FIG. 7, in central control unit 101 the receipt of an on-hold signal from one of the On-Hold units 102 causes the particular telephone line 1 or 2 to be placed in an on-hold state, in a manner known in the art, and a coded response on-hold signal is transmitted back to the On-Hold units 102. The processor 603 in On-Hold units 102 respond to the response on-hold signal response from central control unit 101 and received via RF transceiver 601 to light the associated line LED 300a or 300b indicating that the particular telephone line 1 or 2 is indeed placed on-hold.

When a person using the last mentioned telephone 103 or 104 wishes to terminate an on-hold state on the particular telephone they again depress the same button 606 or 607 in FIG. 7 (FIG. 1—301a or 301b) used to initiate the on-hold state, and this causes the same coded RF signal to be re-transmitted to central control unit 101 which responds thereto this time to remove the on-hold state on the particular phone line. Unit 101 then transmits an off-hold signal to the On-Hold units 102 which causes the on-hold LED (FIG. 1—LED 300a or 300b thereat to be turned off.

In FIG. 7 is a schematic block diagram of the central control unit 101. There is an antenna 700 (antenna 310 in FIGS. 2 and 3) connected to an RF transceiver 710 for sending signals to and receiving signals from On-Hold units 102 as previously described with reference to FIG. 6. The on-hold and off-hold signals transmitted and received using transceiver 710 are under the control of processor 703.

In central control unit 101 is a transformer and tip and ring switch 705 to which are connected a Line 1 In 707 (302 in FIG. 3) and a Line 2 In 706 (not shown in FIGS. 3 & 4). Output from switch 705 are a Line 1 Out 710 (302 in FIG. 3) and a Line 2 Out 711 (not shown in FIGS. 2 & 3) that are respectively connected to the telephones 708 and 709 (telephones 103 and 104 in FIG. 4) connected to these lines.

While the invention has been described in detail with particular reference to the disclosed embodiments, it will be understood that variations and modifications can be affected within the spirit and scope of the invention as described herein.

What is claimed is:

1. A telephone on-hold system for use with a telephone line having connected thereto
    one or more telephones that have no built in on-hold capability, the on-hold system comprising:
        a central control unit that is hard wired connected between the telephone line and telephones that are connected to the telephone line, and the central control unit has a transceiver;
        an on-hold unit associated with each of the telephones for which on-hold capability is to be provided, each on-hold unit having a transceiver for communicating with the central control unit transceiver;
        wherein each on-hold unit comprises means manually operated by a person using the associated telephone for causing the transceiver of the last mentioned on-hold unit to transmit a signal to the central control unit transceiver that causes the central control unit to place an on-hold condition on the telephone line, and when the person again operates the manually operated means, the manually operated means causes the transceiver of the last mentioned on-hold unit to transmit a signal to the central control unit transceiver that causes the central control unit to remove the on-hold condition from the telephone line.

2. The telephone on-hold system of claim 1 wherein each on-hold unit further comprises an indicator that indicates to the user of the telephone with which the on-hold unit is associated when the telephone line connected to the telephone via the central control unit is in its on-hold condition.

3. The telephone on-hold system of claim 2 wherein the central control unit comprises means for injecting a signal onto the telephone line connected to the last mentioned telephone via the central control unit when the last mentioned telephone line is in its on-hold condition.

4. The telephone on-hold system of claim 1 wherein the central control unit comprises means for injecting a signal onto the telephone line connected to the last mentioned telephone via the central control unit when the last mentioned telephone line is in its on-hold condition.

5. The telephone on-hold system of claim 3 wherein the injected signal is music or audio that is heard on the last mentioned telephone when the telephone line associated with the telephone has been placed on-hold by the central control unit.

6. The telephone on-hold system of claim 4 wherein the injected signal is music or audio that is heard on the last mentioned telephone when the telephone line associated with the telephone has been placed on-hold by the central control unit.

* * * * *